Figure 1:
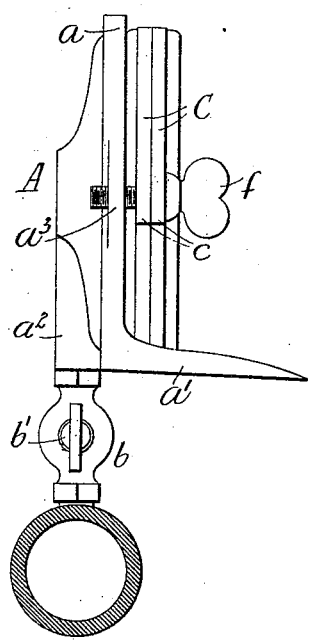

No. 621,317. Patented Mar. 21, 1899.
W. W. BOLLS.
FILTER.
(Application filed May 3, 1898.)

(No Model.)

WITNESSES
Ben Temple Webster
Arthur Browning

INVENTOR
Wm Willis Bolls.
By W. W. Dudley & Co
his Attorneys.

THE NORRIS PETERS CO., PHOTO-LITHO., WASHINGTON, D. C.

UNITED STATES PATENT OFFICE.

WILLIAM WILLIS BOLLS, OF WASHINGTON, DISTRICT OF COLUMBIA.

FILTER.

SPECIFICATION forming part of Letters Patent No. 621,317, dated March 21, 1899.

Application filed May 3, 1898. Serial No. 679,569. (No model.)

*To all whom it may concern:*

Be it known that I, WILLIAM WILLIS BOLLS, a citizen of the United States, residing at Washington, in the District of Columbia, have invented certain new and useful Improvements in Filters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to filters, and is directed more particularly to that class of such devices which are adapted for use in connection with water-service, and to this end are capable of being coupled to the service-pipe in a manner such as will enable the drawing off of filtered water without interruption of the flow from the usual outlets.

The object of my invention is to obtain in a filter of comparatively simple and inexpensive construction a capacity such as will meet all usual demands and also to secure perfect filtration at all times, provision being made whereby accumulations may be readily removed.

The nature of my invention will become apparent from a reading of the following detailed description, taken in connection with the accompanying drawings, in which—

Figure 2:
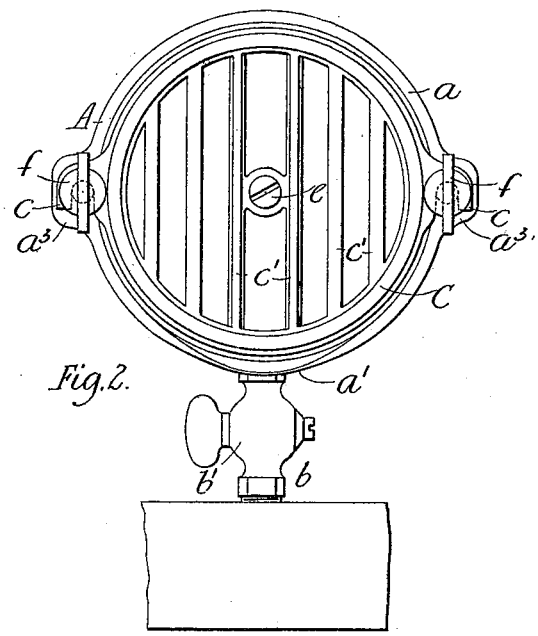
Figure 3:
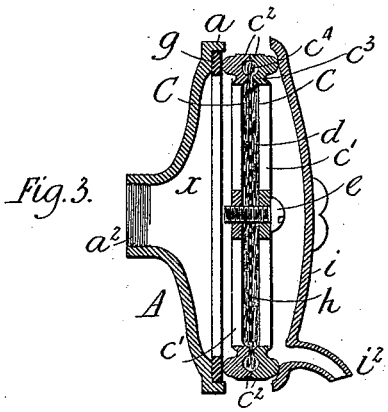
Figure 4:
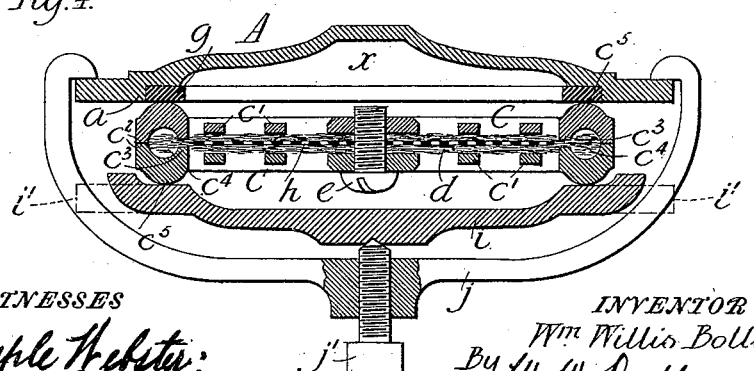

Figure 1 is a side elevation of my improved filter. Fig. 2 is a front elevation thereof. Fig. 3 is a vertical central sectional view showing some modifications. Fig. 4 is a horizontal sectional view, enlarged, showing further modifications.

Referring to the said drawings by letter, A denotes a back plate of circular form, provided at its edge with an annular flange $a$, which at the lower side or base is extended outwardly to provide a spout $a'$, from which the filtered water is drawn. The plate is interiorly concaved and centrally recessed to provide a chamber $x$, which communicates with the water-supply through a passage $a^2$, the inlet of which may be at the lower side of the plate, as shown in Fig. 1, or at the wall of the plate, as shown in Fig. 3. In practice this passage is connected with the service-pipe by a short coupling, as $b$, in which is a controlling-valve $b'$.

C C denote filter-disks, between which the filtering material $d$ is confined. The disks are secured together centrally by a screw $e$, and at each side of the disks are hook-shaped lugs $c\ c$, through which are passed thumb-screws $f f$, the latter engaging threaded openings provided in lugs $a^3\ a^3$, formed integrally with the back plate A. The filter-disks are by means of the thumb-screws $f$ clamped tightly against the flanged edge of the back plate, and a gasket $g$ is interposed at the point of contact to provide a water-tight joint. Each of the filter-disks is provided with cross-bars $c'\ c'$. To afford lateral support for the filtering material and to preclude disintegration of the latter under the action of the water, I interpose between the layers a perforated metal plate $h$. The filter-disks are provided with peripheral flanges $c^2\ c^2$, the inner faces of which are in the plane of the lugs $c$, and when the disks are secured together these flanges are in close contact. Each disk is also provided with a second flange $c^3$, the plane of which is slightly below that of the outer flange $c^2$, and between these flanges is an annular recess $c^4$, preferably semicircular in cross-section. The employment of these flanges and recess insures a rigid connection between the disks and prevents the dislodgment of the filtering material, as the latter is tightly compressed between the flanges $c^3$ and is closely packed in the recess $c^4$. This construction also insures the formation of a water-tight joint between the meeting edges of the disks. On the outer side of each disk opposite the recess is a strengthening-bead $c^5$, the purpose of which is to render the disk rigid throughout.

In Figs. 3 and 4 is shown, in addition to the back plate and filter-disks, a cover $i$, provided with apertured lugs $i'\ i'$ to receive the securing thumb-screws, or, as shown in Fig. 4, in lieu of these securing-screws a clamp consisting of a yoke $j$ and tightening-screw $j'$ may be employed to secure the parts. In the construction employing the cover the filter-disks may be made without the hook-shaped lugs, and, if desired, the filtered water may be drawn off through a tube or outlet $i^2$, provided in the cover, as shown.

In practice the filter is fitted to a service-pipe in any suitable manner—such, for instance, as that indicated in Fig. 1. The service-water entering the chamber $x$ under pressure is forced through the filtering material and freed from all foreign matter and impurities and is drawn off at the spout or at the outlet in the cover, as the case may be. The form and location of the water-chamber with reference to the filtering disks and material enables rapid filtration and largely increases the capacity of devices of this character. The construction and manner of securing the disks to place permits of the same being reversed to bring that side of the material which is covered with the accumulations into position to be readily cleansed by brushing or otherwise during filtration, after which readjustment is unnecessary, owing to the fact that filtration will take place in either position of the disks.

The provision of the means for obtaining a tight connection between the disks and between the disks and back plate precludes leakage of unfiltered water, and, moreover, the parts are thereby held together against accidental disconnection. While the cover $i$, above referred to, may be used in every instance, still it is my purpose to employ the same in the larger sizes of filters. It is also preferable to employ in the larger sizes more than one screw for connecting the disks. The construction of the disks and the means for connecting the same together enable the replacing of the filtering material from time to time to be readily accomplished, and this without removing the back plate from the service-pipe.

The device is very simple in construction, may be cheaply made, is readily attached, and is not liable to disorder.

I claim as my invention—

1. A filter comprising a back plate provided with a water-chamber and an inlet thereto, disks secured together with interposed filtering material between them, and devices for removably attaching the secured disks and interposed material to the back plate in a manner to permit of the reversal of the material without separating the disks, substantially as described.

2. A filter comprising a flanged back plate provided with a water-chamber and an inlet thereto, filter-disks secured together with interposed filtering material, hook-shaped lugs on the disks, and thumb-screws entering lugs on the back plate and engaged by the lugs on the disks, substantially as described.

3. A filter comprising a back plate provided with a water-chamber and an inlet thereto, disks secured together with interposed filtering material between them, a gasket between the disks and back plate, a cover, and devices for removably attaching the back plate, secured disks and cover in a manner to permit of the reversal of the material without separating the disks, substantially as described.

4. A filter comprising a flanged back plate provided with a water-chamber and an inlet thereto, filter-disks each provided with cross-bars and detachably secured together with filtering material between them, a perforated metal plate interposed between the layers of material, hooks on the disks, and thumb-screws for removably securing the disks by their hooks to the back plate, substantially as described.

5. A filter comprising a flanged back plate provided with a water-chamber and an inlet thereto, filter-disks each provided with cross-bars and with an outer flange, an inner flange below the plane of the outer flange, and a depression between the flanges, filtering material between the disks, means for securing the disks together, and means for securing the assembled disks to the back plate, substantially as described.

In testimony whereof I affix my signature in presence of two witnesses.

WILLIAM WILLIS BOLLS.

Witnesses:
W. C. NORTON,
B. T. WEBSTER.